United States Patent [19]

Grindley et al.

[11] 3,864,732

[45] Feb. 4, 1975

[54] TAPE DUPLICATING DEVICE

[75] Inventors: Robert M. Grindley, Glendale; Michael J. Strong, Simi, both of Calif.

[73] Assignee: International Audio-Visual Hong Kong Ltd., Hong Kong, Hong Kong

[22] Filed: Apr. 19, 1972

[21] Appl. No.: 245,572

[52] U.S. Cl. .................................... 360/15, 360/92
[51] Int. Cl. .......................................... G11b 5/86
[58] Field of Search ............... 179/100.2 E, 100.2 Z; 274/3, 4 C; 242/75.43, 55.19 A, 197-200; 360/15-17, 91-92

[56] References Cited

UNITED STATES PATENTS

| | | | |
|---|---|---|---|
| 2,560,234 | 7/1951 | Masterson | 179/100.2 E |
| 3,177,299 | 4/1965 | Smith | 179/100.2 E |
| 3,419,228 | 12/1968 | Harless | 242/75.43 |
| 3,620,476 | 11/1971 | Cervantes | 179/100.2 E |
| 3,677,554 | 7/1972 | Smith et al. | 179/100.2 E |
| 3,721,450 | 3/1973 | Medeiros | 179/100.2 E |

*Primary Examiner*—Alfred H. Eddleman
*Attorney, Agent, or Firm*—Lyon & Lyon

[57] ABSTRACT

A tape duplicating device is disclosed which is capable of transmitting information on a master magnetic tape to one or a plurality of receiving tapes. Each receiving tape is mounted on a separate panel and is driven by a capstan common to the master and all receiving tapes. Provision is made for accepting tape cartridges which are used for handling the receiving tapes. Tapes may originate from the cartridge or a supply reel. Total control of each panel is supplied through the single capstan and self braking devices.

22 Claims, 9 Drawing Figures

TAPE DUPLICATING DEVICE

This invention relates to a multiple tape recording unit and is particularly directed to the simultaneous transmission of information stored on a master magnetic tape onto a multiple number of receiving magnetic tapes which are subsequently encased in tape cartridges.

Multiple tape recording devices have been in use for some time. The multiple tape recording units which have been used for handling modern tape cartridges have conventionally recorded onto the receiving tapes while those tapes were located within their respective cartridges. By recording with the receiving tapes so positioned, certain disadvantages have been experienced. It has been found, for example, that with the tape located in the cartridge, the fidelity of the resulting recording was adversely affected. Further, versatility and control were compromised by the limited access imposed by the cartridge shell. Other multiple recording devices employed heretofore have utilized removable mounting panels, but these panels have not incorporated cartridge handling systems.

The present invention employs removable mounting panels having tape handling systems located thereon. Means are provided for handling cartridges where the tape is either already wound on the cartridge or is supplied to the cartridge from an external supply reel during the recording operation. When the tape is initially located in the cartridge, the system contemplates drawing a loop of tape from the cartridge which is then threaded past a remote magnetic head. In this way, the disadvantages associated with recording with the tape completely mounted in the cartridge are circumvented. Further, the present invention provides for the complete control of the receiving tapes on each panel through a single capstan. This capstan drives each of the receiving magnetic tapes across their respective magnetic recording heads and also drives the take-up reel located within each cartridge. To provide the required resistance to prevent backlash on the supply reels, brake shoes are automatically operated by floating arm tension mechanisms though eccentric mounts. These braking mechanisms help make possible the simplicity of design and operation of the unit. Further objects and advantages will appear hereinafter.

Figure 1:
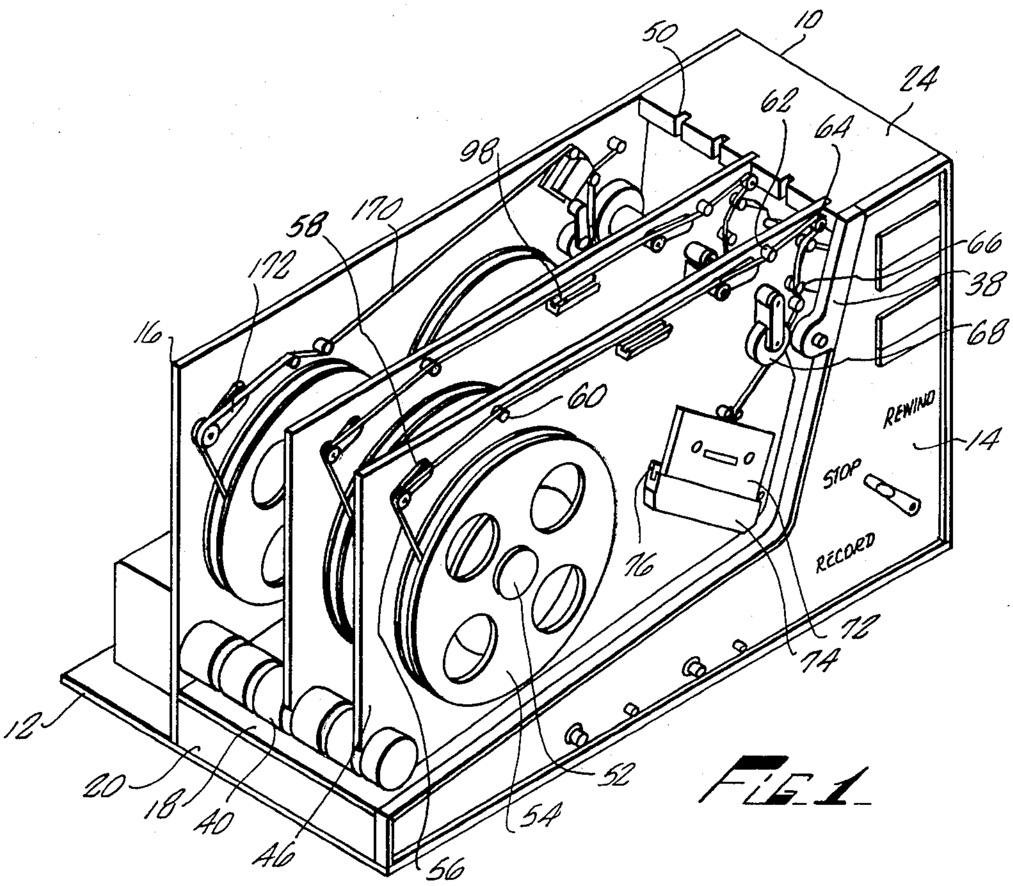
FIG. 1 is a perspective view of the tape duplicating unit.

Referring to the drawings, the tape duplicator frame generally designated 10 includes a base plate 12, a front panel 14, a back mounting plate 16 and a cover sheet 18. End pieces 20 and 22 provide structural rigidity to the unit as does top plate 24. Mounting plate 26 is welded to the top plate 24. Brackets 28 are in turn bolted to the mounting plate 26. Finally, magnetic tape heads 30 and guide rollers 32 and 34 are mounted to brackets 28. Rotatably mounted in back plate 16, capstan 36 extends laterally across the frame 10. Capstan support bracket 38 is rigidly mounted on frame 10 to rotatably support one end of capstan 36. Mounting bar 40 is securely bolted at one end to the back plate 16 by bolt 42. Slots 44 are provided on mounting bar 40 to accommodate each mounting panel 46. Notches 48 are provided in each panel 46 to mate with the mounting bar 40. Each mounting panel 46 is positioned relative to the mounting bar 40 as shown in phantom in FIG. 5 to either lock or unlock it from the bar 40. By rotating the panel 46 into the operating position, it thereby becomes locked on the bar 40. Notches 50 are provided in the top plate 24 to provide lateral support and positioning for each panel 46. Positions for five mounting panels 46 are illustrated. However, any number of panel positions may be provided.

Figure 9:
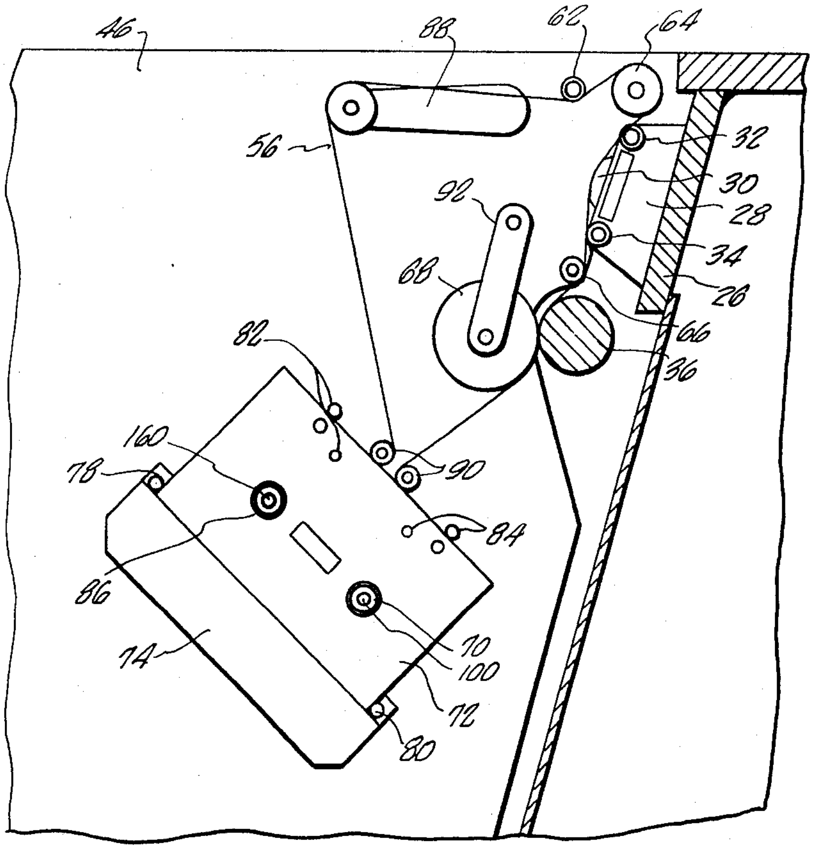
FIG. 9 illustrates a mounting panel where the receiving tape was prewound in the cartridge.

Each panel 46 has a spindle 52 rotatably mounted thereon. Magnetic tape reel 54 is then positioned on the spindle 52. Magnetic tape 56 is threaded preferably before each panel is positioned onto the unit 10. The tape 56 is threaded over a floating arm tension mechanism 58 and guide rollers 60, 62, 64 and 66 as shown. Finally, tape 56 is threaded across roller 68 and spliced onto the cartridge take-up reel 70. Cartridge 72 is positioned on bracket 74 which is slotted at 76 for this purpose. Pins 78 and 80 operate to position the cartridge 72 laterally in the slot 76. Pins 82 and 84 further hold the cartridge 72 in place. Alternately, tape 56 may be prewound on the cartridge supply reel 86 as shown in FIG. 9. In this instance, the tape 56 is looped up over the floating arm tension mechanism 88 and then threaded as before. Naturally, the supply reel 54 would not be required in this instance. Rollers 90 reduce friction on tape 56 and guide its travel.

When the panel 46 is positioned on the frame 10, a portion of the tape 56 is pressed over guide rollers 32 and 34 and across the magnetic tape head 30. Also as the panel 46 is positioned onto the frame 10, the tape 56 at the point where it passes roller 68 is pressed against the capstan 36. Roller 68 is rotatably mounted on roller arm 92 which is in turn pivotally mounted to the panel 46. Roller arm 92 extends through panel 46 and is attached to spring arm 94. Spring 96 acts to hold roller 68 through spring arm 94 and roller arm 92 rigidly against capstan 36. In this manner, tape 56 will be driven by the capstan 36 past the tape head 30. Tape splicing block 98 is positioned on panel 46 for convenience.

Figure 5:
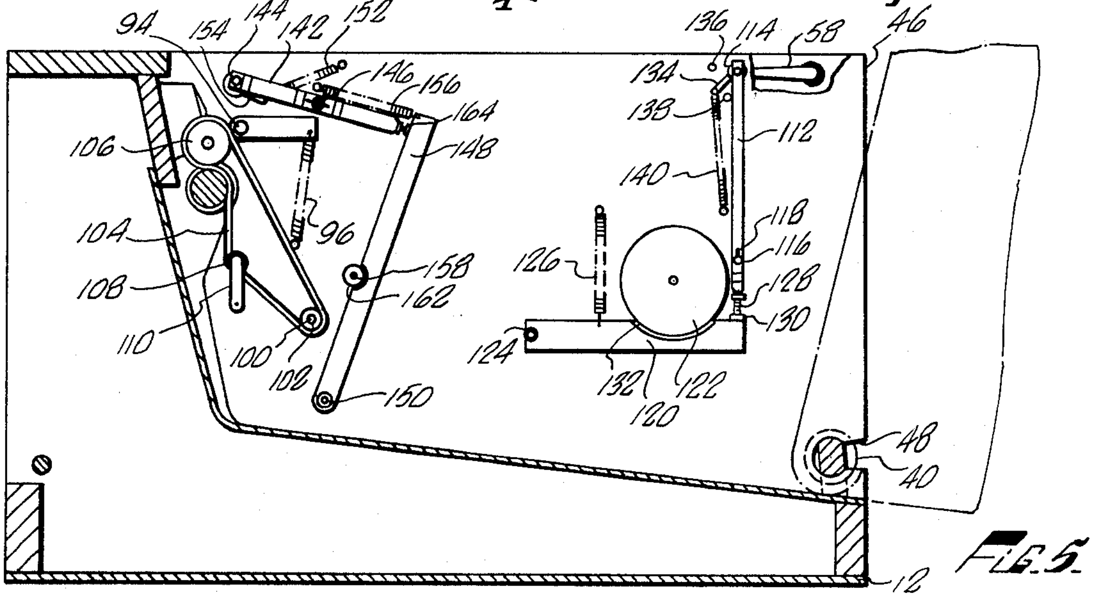
FIG. 5 is a cross-sectional back view of a mounting panel taken along line 5—5 of FIG. 2 showing the panel removal position in phantom.
Figure 3:
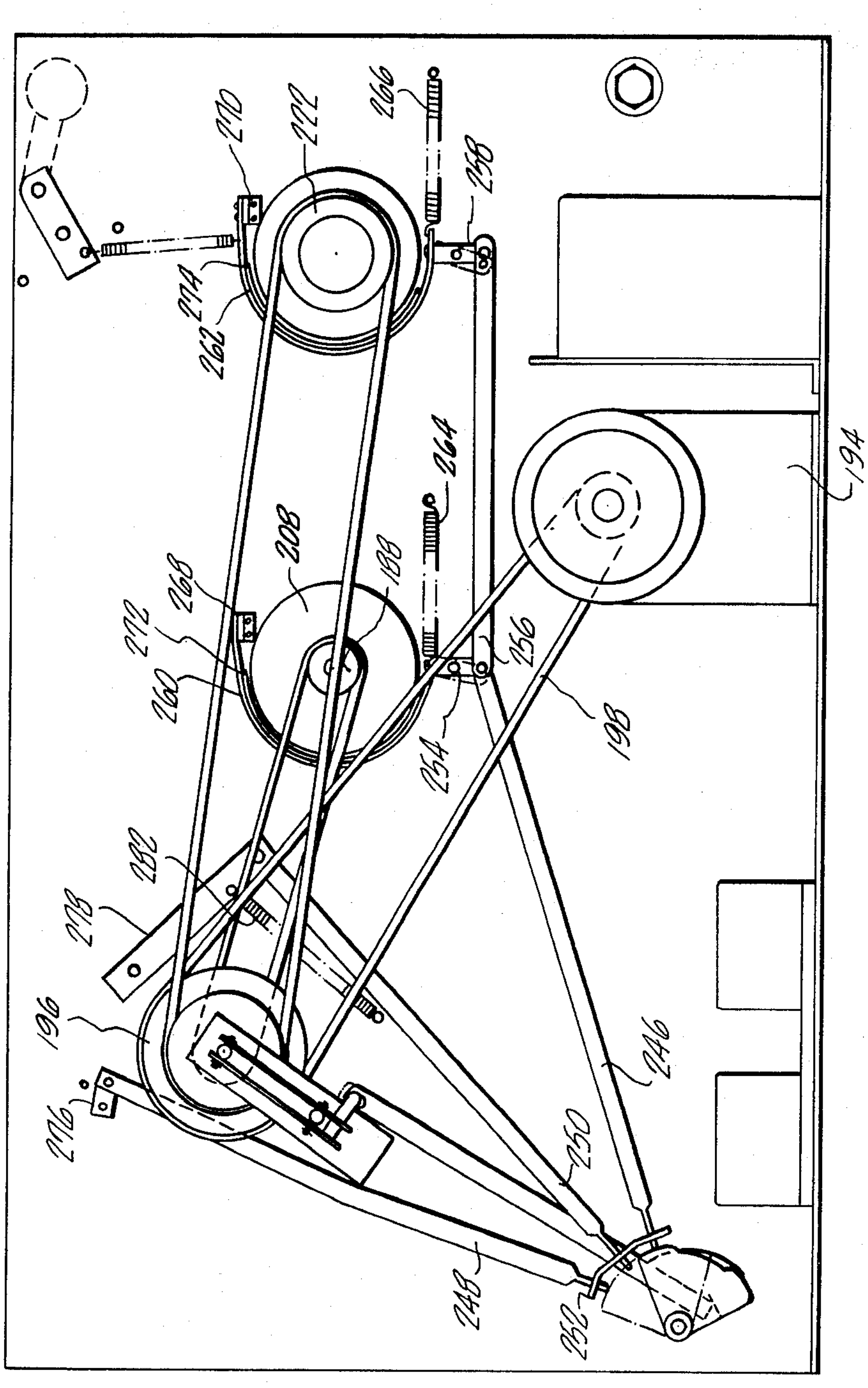
FIG. 3 is a back view of the unit.

A spindle 100 is rotatably mounted to each panel 46 and works in conjunction with the cartridge take-up reel 70. The drive mechanism for spindle 100 is located on the back of each panel 46. Roller 102 is mounted on spindle 100 and is designed to rotate therewith. A rubber band 104 is threaded onto roller 102, roller 106, and roller 108. Roller 106 is rotatably mounted on panel 46. Roller 108 is rotatably mounted to roller arm 110 which is in turn bolted to panel 46. The roller arm 100 can be loosened and repositioned to vary the tension on the rubber band 104. When the panel 46 is positioned on frame 10, the rubber band 104 comes into contact with capstan 36 as illustrated in FIG. 5. The capstan 36 is grooved to provide greater contact with the rubber band 104. As the capstan 36 is driven to advance the receiving magnetic tapes 56, it causes the rubber band 104 to drive roller 102 which in turn operates the take-up reel 70. In this manner, the single capstan 36 is used to drive all receiving magnetic tapes 46 past the magnetic tape heads 30 as well as all of the cartridge take-up reels 70.

To prevent the supply reel 54 from continuing to supply tape 56 after the capstan 36 has stopped, an automatic braking device is employed. Arm 112 is concentrically mounted to an extension 114 of the floating arm tension mechanism 58. Arm 112 is guided by pin 116 along slot 118. As the floating arm tension mechanism is rotated, the eccentrically mounted arm 112 is moved vertically to force brake 120 from wheel 122. Brake 120 is pivotally mounted to the panel 46 by pin 124. Wheel 122 is fixed to spindle 52 and rotates therewith. Spring 126 acts to hold brake 120 securely against wheel 122 when the floating arm tension mechanism 58 has not been pivoted. Screw 128 is threaded into brake 120 and may be adjusted to properly position brake 120 relative to arm 112. Nut 130 is used to lock screw 128 in position. A felt shoe 132 is provided between wheel 122 and brake 120 to increase braking efficiency. An arm 134 is rigidly located on member 114 and acts to limit pivotal motion of the floating arm tension mechanism 58 through interference with stop pins 136 and 138. Spring 140 is provided to bias the floating arm tension member 58 toward the unloaded position. As the tape 56 is advanced by the capstan 36, it exerts tension on the floating arm tension mechanism 58. This tension causes the member 58 to rotate toward the supply reel 54. Initially, the supply reel 54 is constrained from rotating by the brake 120. As the floating arm tension mechanism 58 rotates, the eccentrically mounted arm 112 is displaced vertically which in turn releases the brake 120 allowing the reel 54 to rotate. When the capstan 36 is stopped, the supply reel 54 tends to remain in motion. As more tape 56 is fed from supply reel 54, the tension is relieved and the floating arm mechanism 58 is allowed to return to its original position, thus applying the brake 120.

A similar device is used to control the supply reel 86 of the cartridge 72. Arm 142 is eccentrically mounted to extension 144 of the floating arm tension mechanism 88. Arm 142 is guided by pin 146 as the tension mechanism 88 is rotated. Brake 148 is pivotally mounted to pin 150. Spring 152 acts through arm 154 to keep the tension mechanism 88 in an unrotated position. Spring 156 acts to keep brake 148 against wheel 158 which is attached to spindle 160. A felt brake shoe 162 is provided on brake 148 to improve braking efficiency. A screw 164 is again used to adjust the braking mechanism. As before, the floating arm tension mechanism 88 acts to release the supply reel 86 when tension is provided on tape 56.

Figure 4:
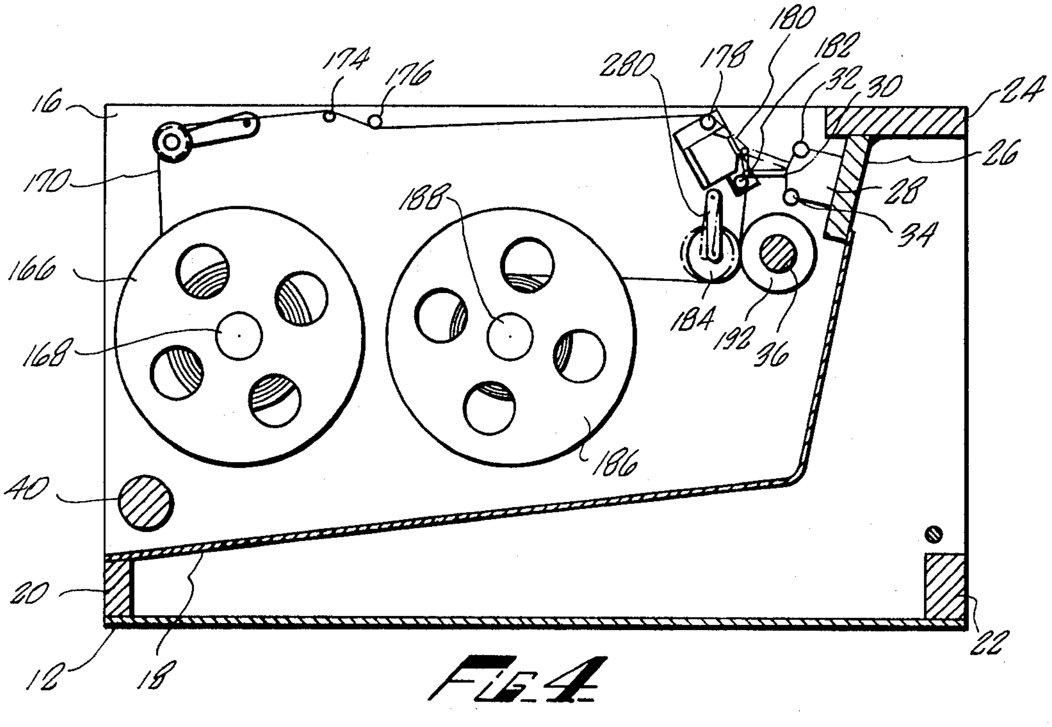
FIG. 4 is a cross-sectional view taken along line 4-4 of FIG. 2.
Figure 2:
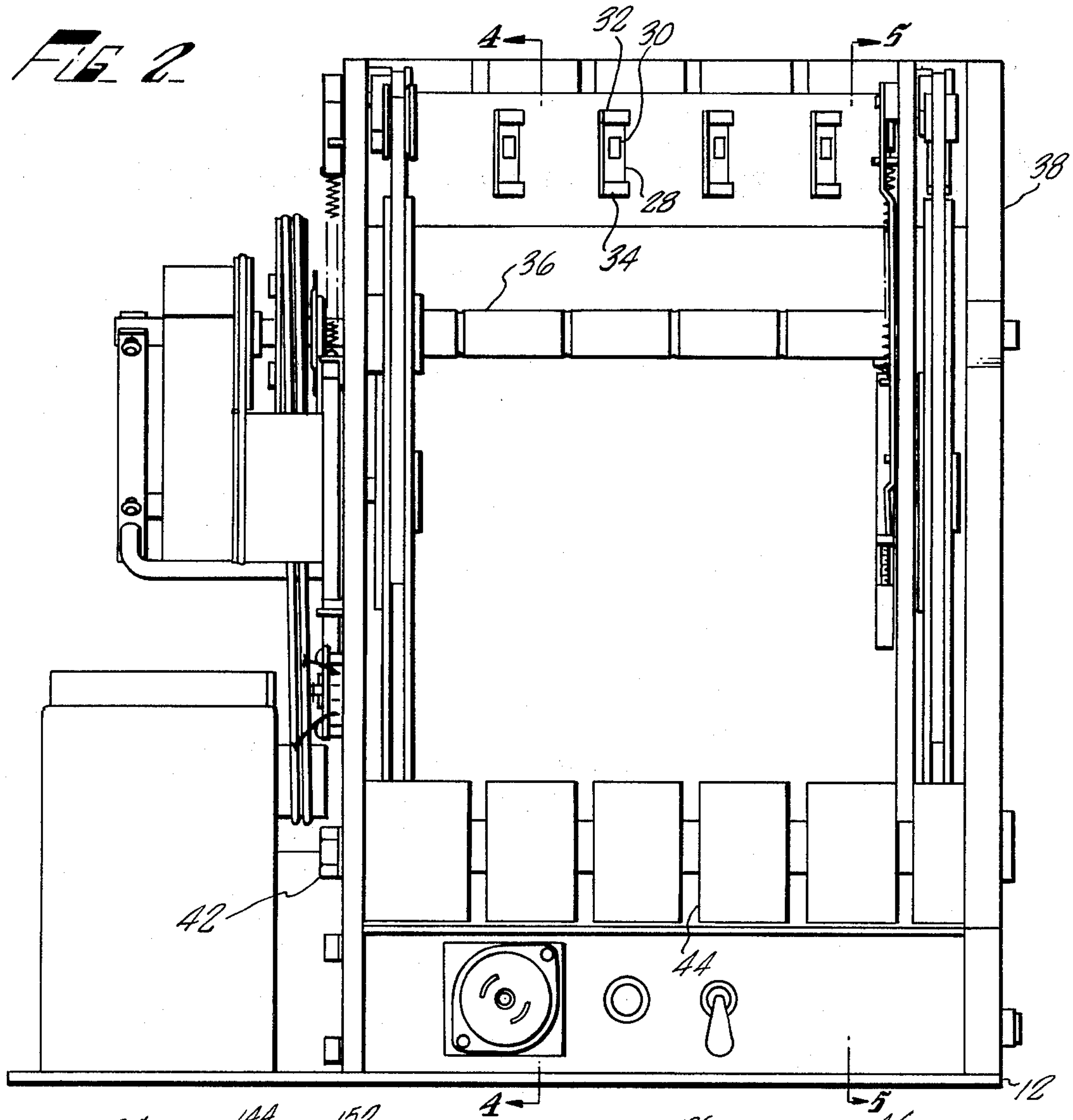
FIG. 2 is a side view of the unit.

Turning now to the master tape deck, supply reel 166 is mounted on spindle 168 which is in turn pivotally mounted to the backplate 16. The master magnetic tape 170 is threaded from the supply reel 166 over a floating arm tension mechanism 172 and then about guide pins 174, 176 and 178 as shown in FIG. 4. Finally, the master 170 is threaded across magnetic tape head 180 and guide pin 182. Finally, the tape is passed around roller 184 and onto take-up reel 186. Take-up reel 186 is mounted on spindle 188 which is rotatably mounted on the backplate 16. A tape lifter 190 is pivotally mounted to backplate 16. When in the record mode, the roller 184 presses the master tape 170 against collar 192. Collar 192 is constrained to rotate with capstan 36 and in this manner drives the master tape 170 at a greater speed than the receiving tapes 56.

Figures 6, 7, 8:
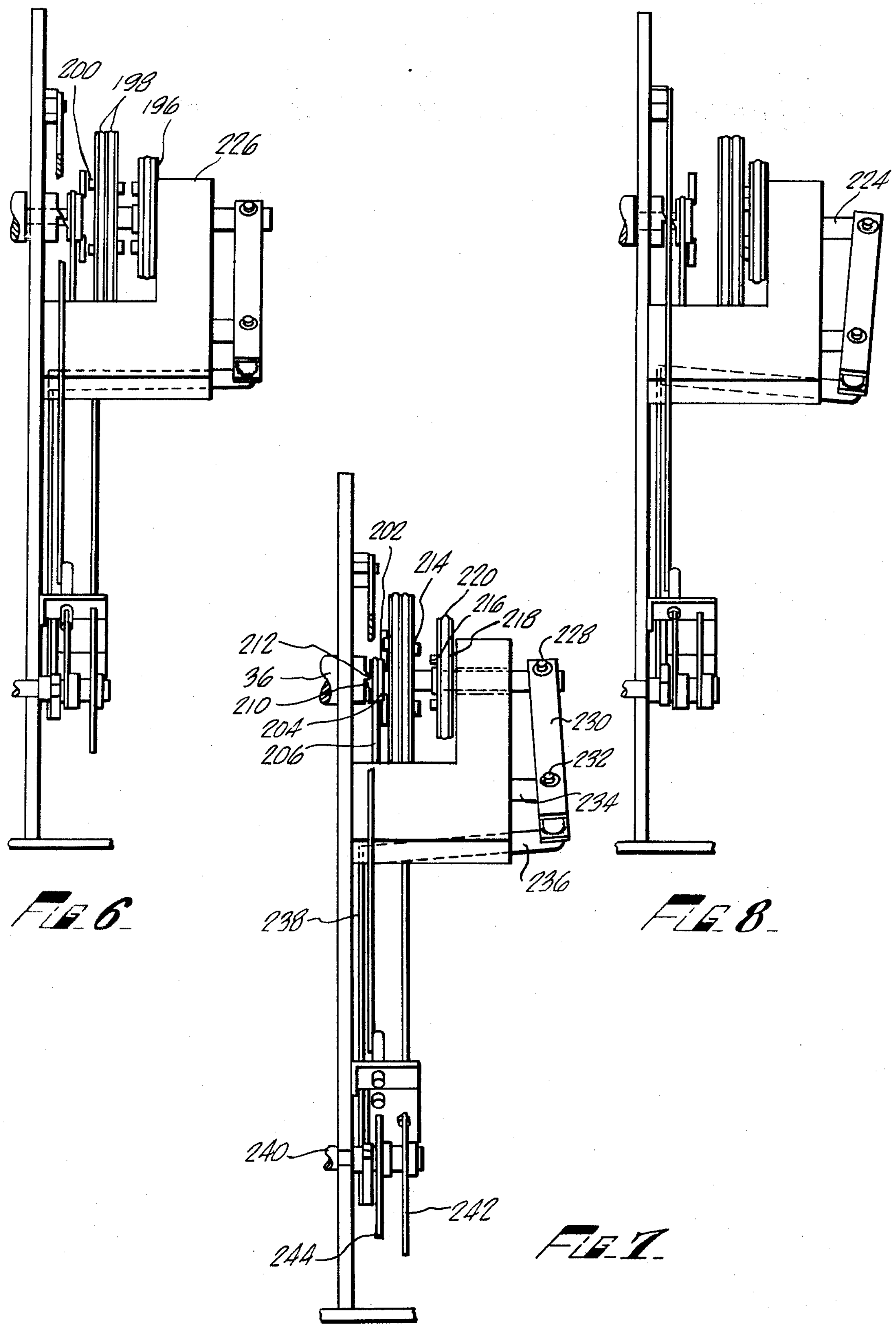
FIG. 6 is a side detail view illustrating the capstan control in the stop position.
FIG. 7 is a side detail view illustrating the capstan control in the record position.
FIG. 8 is a side detail view illustrating the capstan control in the rewind position.

Motor 194 is mounted to the baseplate 12. Power is delivered to the drive wheel 196 by bands 198. The drive wheel 196 operates in three positions as illustrated in FIGS. 6, 7 and 8. In FIG. 6, the drive wheel 196 is in a neutral position, and does not affect rotation of any other component. In FIG. 7, the drive wheel 196 is shown in the record position. In the record position, drive wheel 196 is positioned so that teeth 200 engage bars 202, causing drive member 204 to rotate with drive wheel 196. Band 206 is driven by the rotation of drive member 204 and in turn drives wheel 208. Wheel 208 is rigidly mounted to the take-up spindle 188. Thus in the drive position, the take-up reel 186 is rotated by motor 194. Further, teeth 210 located on drive member 204, are forced into engagement with teeth 212 located on capstan 36.

FIG. 8 illustrates the drive wheel 196 in the rewind position. Teeth 214 are forced into engagement with teeth 216 on pulley 218. Band 220 driven by pulley 218 in turn drives wheel 222. Wheel 222 is rigidly fixed to the supply reel spindle 168, thus causing it to rewind the master tape 170. The drive wheel 196 is rotatably mounted on shaft 224. Shaft 224 is slidably mounted through bracket 226 and is coupled by pin 228 to arm 230. Arm 230 is pivotally mounted by pin 232 to member 234 which is rigidly fixed to bracket 226. Arm 236 is rigidly fixed to pivot arm 230 and to extension arm 238. Extension arm 238 is eccentrically mounted on control shaft 240, thereby creating lateral motion of the drive wheel 196 by pivoting control shaft 240. Rigidly fixed to control shaft 240 are cams 242 and 244. Cam 242 drives follower 246. Cam 244 drives followers 248 and 250. Cam follower guide 252 is rigidly fixed to back plate 16. Cam follower 246 is pinned to pivot arm 254 and arm 256. Arm 256 is in turn pinned to pivot arm 258. Pivot arms 254 and 258 are pivotally mounted to back plate 16 and are respectively attached to brake bands 260 and 262 against wheels 208 and 222 respectively. Brackets 268 and 270 are provided to anchor brake bands 260 and 262 to back plate 16. Brake linings 272 and 274 are provided to increase the efficiency of braking. Cam 242 is designed to force cam follower 246 radially away from the control arm 240 when the drive wheel 196 is in either the record position as illustrated in FIG. 7 or the rewind position as illustrated in FIG. 8. When the drive wheel 196 is in the neutral position as shown in FIG. 6, the cam 242 is designed to allow cam follower 246 to travel toward control arm 240 which allows springs 264 and 266 to draw brake bands 260 and 262 into contact with wheel 208 and 222. Thus, a braking action is provided for reels 166 and 186 only when the drive wheel 196 is in the neutral position.

Cam 244 acts to force cam follower 248 radially outward when the drive wheel 196 is in the rewind position as illustrated in FIG. 8. Cam follower 248 is pinned to pivot arm 276. Pivot arm 276 is fixed to tape retract arm 190. This causes the master tape 170 to lift away from the magnetic tape head 180 during rewind to prevent abrasion of the tape head 180 by the master tape 170. Cam 244 operates to force follower 248 radially outward in both the rewind and neutral positions as illustrated in FIGS. 6 and 8. Cam follower 250 is pinned to pivot arm 278 which is in turn fixed to roller arm 280. Spring 282 acts to resist the outward motion of cam follower 250. When follower 250 is extended, roller 184 is displaced from the capstan collar 192. In the record position, the follower 250 is released and spring 282 draws roller 184 into contact with capstan collar 192 causing the tape 170 to be advanced across the magnetic tape head 180.

In summary, when control arm 240 is in the stop position, the drive wheel 196 is in the neutral position as illustrated in FIG. 6. Also, master reels 166 and 186 are constrained from rotating by brakes 260 and 262; the capstan 36 is not rotating and receiving magnetic tapes 56 have released the floating arm tension mechanisms 58 or 88 thus braking reel 54 or cartridge supply spindle 86. Further, roller 184 is retracted from capstan collar 192.

When control shaft 240 is moved into the record position, the drive wheel 196 is engaged with capstan 36 and further drives master take-up reel 208. As the capstan 36 begins to drive the receiving magnetic tapes 56, the floating arm tension mechanisms 58 or 88 act to release brakes 120 or 148, respectively. Cam 242 has forced follower 246 outward, causing the release of brakes 260 and 262. Thus, the master magnetic tape 170 and the receiving magnetic tapes 56 are driven forward across their respective magnetic tape heads. Capstan 36 further acts to drive take-up reel 70.

When control shaft 240 is moved into the rewind position, drive wheel 196 is engaged with wheel 218 as shown in FIG. 8. In this manner, the master tape 170 is rewound on the supply reel 166. Simultaneously, tape lift-off member 190 draws tape from the magnetic head 180; and roller 184 is drawn away from capstan collar 192. Further, the brakes 260 and 262 are released by cam 242.

The electronics involved in this device are of conventional design and are standard items. Accordingly, it is unnecessary, for an understanding of the invention, to describe the same in greater detail herein.

Having fully described the preferred embodiments, it is to be understood that the invention is not to be limited to the details herein set forth, but that the invention is of the full scope of the appended claims.

We claim:

1. A tape duplicating device comprising a frame; a back mounting plate positioned on said frame; means for mounting a master magnetic tape on said back mounting plate; at least one mounting panel removably positioned on said frame, each of at least said one mounting panel including means for mounting a receiving magnetic tape, having a copy supply spindle rotatably mounted to said mounting panel, a copy take-up spindle rotatably mounted to said mounting panel, and guide means for defining the path of the receiving magnetic tape between said copy supply spindle and said copy take-up spindle; at least one magnetic tape recording head positioned on said frame to intercept the path of the receiving magnetic tape defined by said guide means on at least said one mounting panel; a capstan mounted on said frame; means for clamping the receiving magnetic tape on at least said one mounting panel against said capstan, said means being pivotally mounted on at least said one mounting panel; electronic means for transmitting information from a master magnetic tape onto receiving magnetic tapes; means to drive said mounting means for mounting a master magnetic tape and said capstan; and means mounted on at least said one mounting panel for driving said copy take-up spindle using said capstan; at least said one mounting panel, said means for mounting a receiving magnetic tape, said means for clamping the receiving magnetic tape against said capstan and said means for driving said copy take-up spindle being in operable association with said capstan and at least said one magnetic tape recording head such that said mounting panel may be positioned on and removed from said frame without rethreading of the receiving magnetic tape.

2. The device of claim 1, wherein said mounting means for a receiving magnetic tape includes said copy supply spindle positioned to receive a cartridge supply reel, means for fixing a cartridge to said mounting panel, and said copy take-up spindle being positioned to receive a cartridge take-up reel.

3. The device of claim 2 wherein said mounting means for a receiving tape further includes a copy supply spindle for a tape reel.

4. The device of claim 3, wherein said receiving tape mounting means further includes means for braking said supply reel spindle and means for braking said cartridge supply reel spindle.

5. The device of claim 4, wherein each of said braking means comprise a floating arm tension mechanism, a wheel constrained to rotate with said respective supply reel spindles, and a brake capable of forcible contact with the outer perimeter of said wheel; said braking means being operably connected to said floating arm tension mechanism to engage said wheel when tension is released on the receiving tape.

6. The device of claim 2, wherein the receiving magnetic tape contacts said magnetic tape recording head exterior to the receiving cartridge.

7. The device of claim 1 wherein said copy take-up spindle drive means includes a roller rotatably mounted to each of at least said one mounting panel at a point such that said roller is adjacent said capstan with at least said one mounting panel positioned on said frame, a band frictionally constrained to move with said capstan by said roller, and a pulley fixed to rotate with said copy take-up spindle; said pulley being frictionally constrained to move with said band.

8. The device of claim 1, wherein said device further comprises braking means for braking said copy supply spindle, said braking means including a floating arm tension mechanism, a wheel constrained to rotate with said copy, supply spindle, and a brake capable of forcible contact with the outer perimeter to said wheel; said brake being operably connected to said floating arm tension mechanism to engage said wheel when tension is released on the receiving tape.

9. The device of claim 1 wherein said device further comprises operating modes selection means for selectively engaging said capstan drive means in a plurality of operating modes including a drive wheel which can be moved laterally in a first direction to engage said capstan and laterally in a second direction to engage alternately said master tape mounting means.

10. The device of claim 1 wherein the master magnetic tape is driven by said capstan.

11. A tape duplicating device comprising a frame; a capstan mounted on said frame; means for mounting a master magnetic tape on said frame; a plurality of mounting panels removably positioned on said frame; a plurality of magnetic tape recording heads positioned on said frame, each one of said plurality of magnetic tape recording heads being positioned adjacent one of said plurality of mounting panels; means positioned on each of said mounting panels for mounting a receiving magnetic tape to be fed into a cartridge; said mounting means including, a spindle for a cartridge supply reel, means for fixing the cartridge to said panel, guide means for constraining the receiving magnetic tape to a path directed across said magnetic tape head associated with each said mounting panel, a spindle for a cartridge take-up reel, and means for driving said cartridge take-up reel spindle using said capstan; means mounted to each said mounting panel for clamping each receiving magnetic tape against said capstan; electronic means for transmitting information from a master magnetic tape onto the receiving magnetic tapes; means to drive said means for mounting a master magnetic tape and said capstan; and means for selectively engaging said drive means in a plurality of operating modes; each said mounting panel being capable of being positioned on and removed from said frame without rethreading of the receiving magnetic tape associated therewith.

12. The device of claim 11, wherein said take-up reel drive means includes a band frictionally constrained to move with said capstan, and a pulley fixed to rotate with said take-up reel spindle; said pulley being frictionally constrained to move with said band.

13. The device of claim 12, wherein the receiving magnetic tape contacts said magnetic tape recording head exterior to the receiving cartridge.

14. The device of claim 11, wherein said receiving tape mounting means further includes means for braking said cartridge supply reel spindle.

15. The device of claim 14, wherein said braking means comprises a floating arm tension mechanism, a wheel constrained to rotate with said supply reel spindle, a brake capable of forcible contact with the outer perimeter of said wheel; said brake being operably connected to said floating arm tension mechanism to engage said wheel when tension is released on the receiving tape.

16. The device of claim 15, wherein the operating modes selection means comprises a drive wheel which can be moved laterally to engage said capstan and alternately said master tape mounting means.

17. The device of claim 11, wherein said mounting means for receiving tape further includes a supply spindle for a tape reel.

18. The device of claim 17, wherein said receiving tape mounting means further includes means for braking said supply reel spindle and means for braking said cartridge supply reel spindle.

19. The device of claim 18, wherein each of said braking means comprise a floating arm tension mechanism, a wheel constrained to rotate with said respective supply reel spindles, a brake capable of forcible contact with the outer perimeter of said wheel; said brake being operably connected to said floating arm tension mechanism to engage said wheel when tension is released on the receiving tape.

20. A tape duplicating device comprising a frame; at least one magnetic tape recording head positioned on said frame; a capstan mounted on said frame; means for mounting a master magnetic tape on said frame; at least one mounting panel removably positioned on said frame; means positioned on each of said mounting panels for mounting a receiving magnetic tape to be fed into a cartridge; said receiving tape mounting means includes a spindle for a cartridge supply reel, means for fixing the cartridge to said panel, guide means for constraining the receiving tape to a path directed past said magnetic tape head, and a spindle for a cartridge take-up reel; means clamping each receiving magnetic tape against said capstan; means for driving said cartridge take-up reel spindle using said capstan; said cartridge take-up reel drive means including a band frictionally constrained to move with said capstan, and a pulley fixed to rotate with said take-up reel spindle; said pulley being frictionally constrained to move with said band; means to drive a master magnetic tape and said capstan; means for selectively engaging said drive means in a plurality of operating modes; and means for braking said cartridge supply reel spindle; each said mounting panel being capable of being positioned on and removed from said frame without rethreading of the receiving magnetic tape associated therewith.

21. The device of claim 20, wherein said braking means comprises a floating arm tension mechanism, a wheel constrained to rotate with said supply reel spindle, a brake capable of forcible contact with the outer perimeter of said wheel; said brake being operably connected to said floating arm tension mechanism to engage said wheel when tension is released on the receiving tape.

22. The device of claim 21, wherein the receiving magnetic tape contacts said magnetic tape recording head exterior to the receiving cartridge.

* * * * *